United States Patent [19]
Fouces et al.

[11] 3,719,063
[45] March 6, 1973

[54] DEVICE FOR PREVENTION OF AUTOMOBILE THEFT

[76] Inventors: Manuel Fouces; Juan M. Fouces, both of 2416 Mandell, Houston, Tex. 77006

[22] Filed: July 1, 1971

[21] Appl. No.: 158,785

[52] U.S. Cl..................................70/202, 294/106
[51] Int. Cl. ...............................................G05g 5/00
[58] Field of Search......70/202, 203; 294/19 R, 50.8, 294/50.9, 106

[56] References Cited

UNITED STATES PATENTS

| | | | |
|---|---|---|---|
| 1,142,845 | 6/1915 | Rothenbucher | 70/202 |
| 3,147,993 | 9/1964 | Broderson et al. | 294/106 X |
| 2,638,372 | 5/1953 | Proetz | 299/50.8 |
| 2,931,207 | 4/1960 | Fisher | 70/202 X |

Primary Examiner—Ernest R. Purser
Assistant Examiner—William F. Pate, III
Attorney—Carlos A. Torres et al.

[57] ABSTRACT

A device for preventing the theft of an automobile may comprise a support for attachment to an automobile and a jaw assembly mounted on the support for fastening the acceleration pedal assembly of an automobile in a non-depressed position. The jaw assembly may be attached to a rod member for opening and closing the jaws. The rod may be provided with teeth for engaging a locking device to hold the jaws in the closed or fastening position.

5 Claims, 3 Drawing Figures

3,719,063

MANUEL FOUCES
JUAN MANUEL FOUCES
INVENTOR.

BY Carlos A. Torres
Bill B. Berryhill

ATTORNEYS

DEVICE FOR PREVENTION OF AUTOMOBILE THEFT

BACKGROUND OF THE INVENTION

1. Field of the Invention

The present invention relates to anti-theft devices for automobiles. More specifically, it concerns a device for locking an automobile accelerator in a non-depressed position to limit the amount of gasoline being delivered to the automobile engine.

2. Description of the Prior Art

In recent years there has been a large increase in the number of automobile thefts. It is a simple matter for professional automobile thieves to enter a locked car and bypass the ignition lock. Even amateurs, pranksters, and "joy riders" have relatively no trouble in bypassing the standard locking devices of an automobile.

Many anti-theft devices have been developed in efforts to provide simple and fool proof methods of preventing theft. Examples of some of the more recent developments in this area may be seen in the following U.S. Pat. Nos.:

| | |
|---|---|
| 2,931,207 | 3,245,239 |
| 2,933,916 | 3,435,646 |
| 3,190,090 | 3,550,409 |

Many of these devices require alteration of the automobile structure. Others are rather bulky and cumbersome. The fact that so many of these devices have been developed is evidence of itself that a universally accepted method has not yet been found.

SUMMARY OF THE INVENTION

The present invention provides an easily installed device for locking the accelerator pedal of an automobile in the non-depressed position. The device comprises a locking jaw which is suitably mounted for locking around the accelerator pedal linkage or rod. These jaws may be pivoted into place by a pulling rod attached to the jaws. The rod is provided with teeth which engage a ratchet type lock for holding the rod and jaws in the locked position. By turning the key in the lock, the rod and jaws, which are spring biased to the open position, are opened. The device is simple to install, simple to operate, and virtually theft-proof. Other objects and advantages of the invention will be apparent from the description which follows.

DESCRIPTION OF THE PREFERRED EMBODIMENTS

Figure 1:
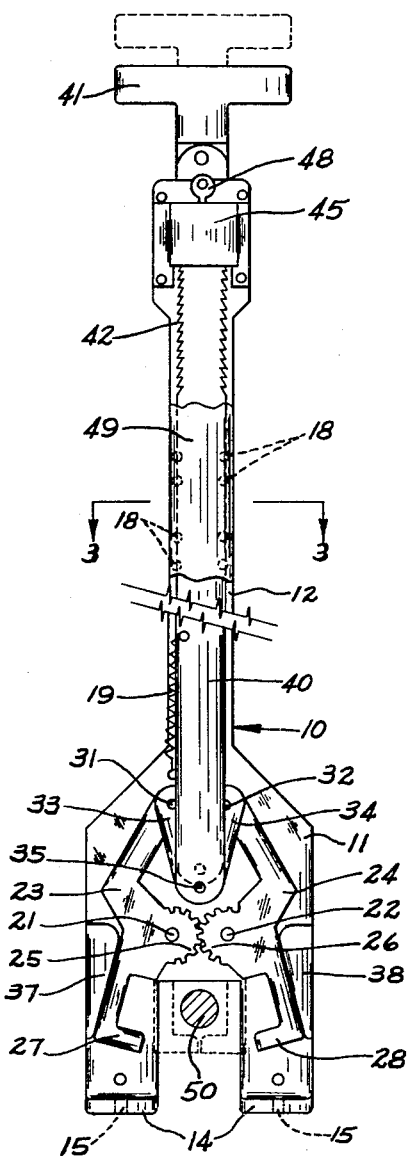
FIG. 1 is a frontal view of an auto anti-theft locking device, according to a preferred embodiment of the invention, a portion of the housing of which has been broken away.

Referring first to FIG. 1, the anti-theft device of the present invention comprises a support member 10 having a lower head portion 11 and an upper, elongated neck portion 12. The head portion 11 is provided with mounting lugs 14 through which holes 15 may be drilled. Mounted on the head portion 11 by pivots 21 and 22 is a pair of jaws 23, 24. These jaws may be provided with intermeshing gear portions 25 and 26 to assure uniform pivoting of the jaws. The lower end of the jaws are provided with locking teeth 27, 28.

The upper ends of the jaws are attached by pivots 31, 32 to linkages 33, 34. These linkages 33, 34 are in turn pivotally attached to the lower end of an elongated operating rod member 40. A handle 41 is attached to the upper end of rod 40. Ratchet-like teeth 42 are machined on the edges of rod 40 near its upper end, for engagement with a ratchet type lock 45 which is attached to support member 10. A cover member 49, most of which is broken away in FIG. 1, is attached to support 10 and covers most of rod 40 and jaws 23, 24 to prevent tampering with the device.

Figure 2:
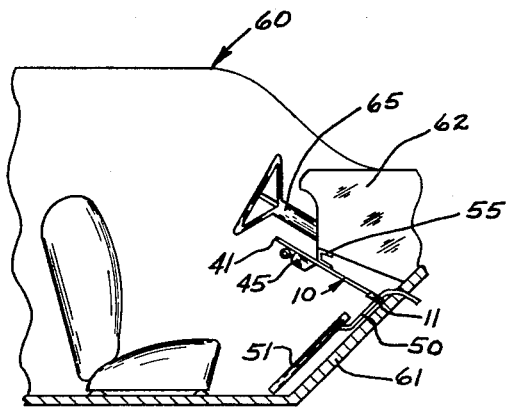
FIG. 2 is a side elevational view showing the device of the invention as it might be attached to an automobile.

Referring now also to FIG. 2, the operation of the anti-theft device will be described. The device may be mounted so that the locking head 11 straddles the accelerator linkage 50 of accelerator pedal 51 in an automobile, designated generally at 60. The lugs 14 may be attached to the floor-board 61 of the automobile by bolts (not shown) placed in holes 15. The upper end of the device may be attached to the dashboard 62 by an adjustable bracket 55. This bracket 55 may be fastened to the neck 12 of support 10 at a number of positions by screws or the like placed in a suitable pair of holes 18.

Figure 3:
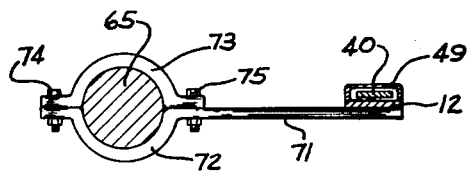
FIG. 3 is a cross-sectional view of the invention taken along line 3—3 of FIG. 1 showing an alternative means for attaching the device to the steering column of an automobile.

Alternatively, a lateral bracket may be attached to the back of the device as shown in FIG. 3. Such a bracket may comprise an arm portion 71 fastened to support neck 12 and extending laterally therefrom where a semi-circular portion 72 engages the steering column 65. A semi-circular clamp 73 is then attached on the opposite side of the steering column to form a ring thereform, held in place by means such as bolts 74 and 75 which may be bradded or welded on the ends to prevent removal. Even if the means of upper attachment were removed or cut by a would-be thief, the attachment of lugs 14 to the floorboard of the car would still prevent its removal or malfunctioning.

To lock the accelerator pedal 51 in the non-depressed position, the handle 41 is gripped by its operator and pulled upwardly, causing the jaws 23, 24 to pivot until teeth 27, 28 engage each other, surrounding the accelerator pedal linkage 50, as indicated by the dotted lines in FIG. 1. This position is maintained until a key 48 is inserted in lock 45 and turned to release the lock 45. A spring 19 attached at one end to rod 40 and at the opposite end to support 10 biases the rod 40 and, consequently, jaws 23, 24 toward the open position. As soon as the lock 40 is released, the rod 40 and jaws 23, 24 assume the initial or open position. Stops 37 and 38 limit their movements. When locked, the device prevents the accelerator foot pedal 51 from being depressed and thereby prevents operation of the automobile.

Thus, it can be seen that the present invention provides a simple, economical, yet very dependable method of preventing the theft of an automobile. The device can be easily supplied on new automobiles and lends itself to quick installation on used automobiles. It could be easily carried and sold by automobile supply stores. Although only two embodiments of the invention have been described herein, many variations thereof will be obvious to those skilled in the art. It is therefore intended that the scope of the invention be limited only by the claims which follow.

We claim:

1. A device for preventing the theft of an automobile comprising: support means attached to the floorboard of said automobile near its accelerator pedal assembly; fastening means attached to said support means movable from a first position to a second position whereby said accelerator pedal assembly is fastened in a nondepressed position; operating means attached to said fastening means for moving said fastening means from said first position to said second position; and lock means engageable with said operating means to lock said fastening means in said second position; said fastening means comprising a pair of jaw members which surround a portion of said accelerator pedal assembly in said second position; said jaw members being attached to said support means by pivot means about which said jaws pivot when moving from said first position to said second position; said operating means comprising an elongated rod member attached to said jaw members by second pivot means; said rod member being provided with lock engaging means engageable with said locking means when said jaws are in said second position to prevent movement of said operating rod and said jaw members.

2. The device of claim 1 in which biasing means is attached to said rod member biasing said rod member and said jaw members toward said first position.

3. The device of claim 2 in which stop means is attached to said support means to prevent said biasing means from moving said jaw members to a position farther away from said second position than said first position.

4. The device of claim 3 in which said support means is also fastened to the dashboard assembly of said automobile.

5. The device of claim 3 characterized in that said support means is also attached to the steering column of said automobile by attachment means.

* * * * *